(12) United States Patent
Hamilton

(10) Patent No.: US 11,032,966 B2
(45) Date of Patent: Jun. 15, 2021

(54) AUDIBLE ALARM FOR SEED TUBE GUARD WEAR

(71) Applicant: AGCO Corporation, Duluth, GA (US)

(72) Inventor: Kevin J. Hamilton, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 39 days.

(21) Appl. No.: 16/346,716

(22) PCT Filed: Sep. 22, 2017

(86) PCT No.: PCT/IB2017/001158
§ 371 (c)(1),
(2) Date: May 1, 2019

(87) PCT Pub. No.: WO2018/083524
PCT Pub. Date: May 11, 2018

(65) Prior Publication Data
US 2020/0053954 A1   Feb. 20, 2020

Related U.S. Application Data

(60) Provisional application No. 62/416,787, filed on Nov. 3, 2016.

(51) Int. Cl.
*A01C 7/20* (2006.01)
*A01C 5/06* (2006.01)

(52) U.S. Cl.
CPC ............. *A01C 7/206* (2013.01); *A01C 5/064* (2013.01)

(58) Field of Classification Search
CPC .. A01C 5/064; A01C 7/04; A01C 7/20; A01C 7/201; A01C 7/206; A01C 7/208
See application file for complete search history.

(56) References Cited

U.S. PATENT DOCUMENTS

| | | | |
|---|---|---|---|
| 4,603,746 A * | 8/1986 | Swales | A01B 15/16 172/559 |
| 5,388,670 A * | 2/1995 | Kuskye | F16D 65/0978 188/1.11 R |
| 5,664,507 A | 9/1997 | Bergland | |
| 5,901,913 A * | 5/1999 | Yamaguchi | A01K 89/02 116/208 |
| 6,209,466 B1 | 4/2001 | Wodrich | |
| 7,096,805 B1 | 8/2006 | Wiesenburger | |
| 9,102,476 B2 * | 8/2015 | Musick | B65G 21/22 |
| 2005/0036724 A1 * | 2/2005 | Derscheid | F16C 21/00 384/624 |
| 2005/0166813 A1 | 8/2005 | Frasier | |
| 2006/0032420 A1 | 2/2006 | Kester | |

(Continued)

OTHER PUBLICATIONS

GB Intellectual Property Office, Search Report for related UK Patent Application No. GB1620881.1, dated Jun. 7, 2017.

(Continued)

*Primary Examiner* — Thomas B Will
*Assistant Examiner* — Ian Alexander Normile

(57) ABSTRACT

A seed tube guard for a row unit has a body having a first portion and a second portion. The second portion carries an audible alert material that is configured to produce an audible sound when scraped across rotating metal. The audible alert material has a material composition distinct from a material composition of the body carrying the audible alert material.

9 Claims, 4 Drawing Sheets

(56) References Cited

U.S. PATENT DOCUMENTS

| | | | |
|---|---|---|---|
| 2012/0266649 A1* | 10/2012 | Paturle | B60C 11/24 |
| | | | 73/8 |
| 2014/0158031 A1 | 6/2014 | Hagny | |
| 2016/0128269 A1* | 5/2016 | Helmick | A01C 7/20 |
| | | | 111/185 |
| 2016/0295793 A1 | 10/2016 | Wiesenburger | |
| 2017/0101832 A1* | 4/2017 | Ramos | E21B 7/046 |
| 2017/0248505 A1* | 8/2017 | Holmes | F16C 11/0628 |
| 2017/0274400 A1* | 9/2017 | Kowalchuk | B05B 12/082 |

OTHER PUBLICATIONS

European Patent Office, International Search Report for related WO Application No. PCT/IB2017/001158, dated Dec. 21, 2017.

* cited by examiner

AUDIBLE ALARM FOR SEED TUBE GUARD WEAR

TECHNICAL FIELD

The present disclosure is generally related to agricultural equipment, and more particularly, agricultural equipment for seeding.

BACKGROUND

Seed tube guards in planter systems are important for planter performance. Not only do seed tube guards protect the seed tubes (which when damaged, negatively affect seed placement), but also help to manage opener disc flex and control a consistent seed trench shape. However, due to their location and the fact that replacing a seed tube guard currently involves a lengthy and arduous process of completely disassembling and reassembling the better part of a row unit, most operators are often unaware when the seed tube guard needs replacement and/or tend to neglect servicing this component.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Overview

Figure 1A:
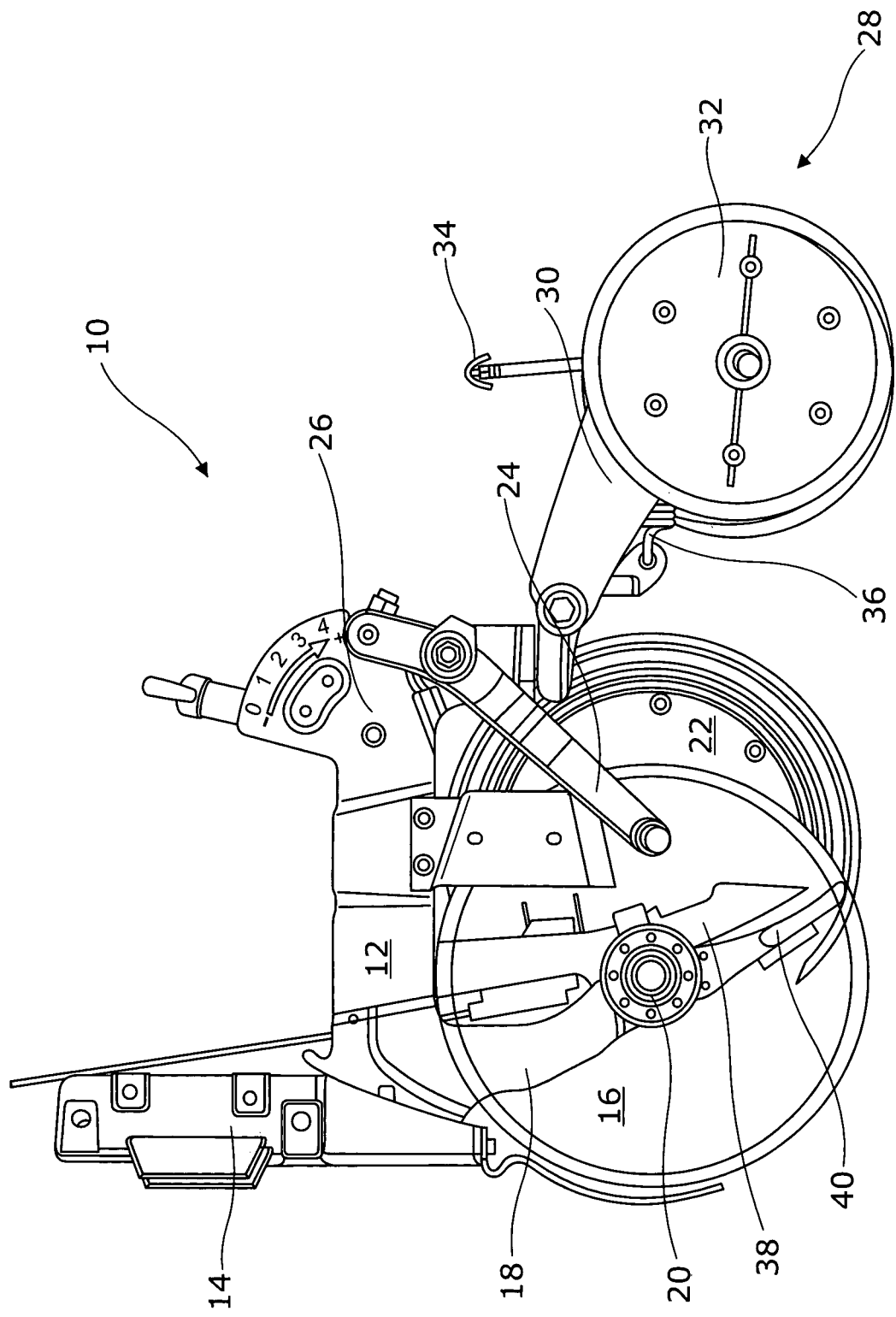
FIG. 1A is a schematic diagram that illustrates, in fragmentary side elevation view, an example row unit comprising an embodiment of a seed tube guard.

In one embodiment, a seed tube guard for a row unit, comprising: a first portion and a second portion, the first portion of a material that is configured to produce a first audible sound when scraped across rotating metal, the second portion of a material that is configured to produce a second audible sound when scraped across rotating metal, the second audible sound distinct from the first audible sound.

DETAILED DESCRIPTION

Certain embodiments of a seed tube guard and associated method are disclosed that provide an audible alert when structural integrity of the seed tube guard is below one or more performance thresholds. The seed tube guard is mounted adjacent a seed tube to protect the seed tube during operations of a row unit, enabling consistent and proper seed placement. The seed tube guard is mounted adjacent an opener disc that is used to form a trench for seed placement during row unit operations, the positioning of the seed tube guard helping to manage opener disc flex and control a consistent seed trench shape. During row unit operations (e.g., planter operations), the positioning of the seed tube guard relative to the opener disc results in a scraping action between one side wall of the seed tube guard and the rotating opener disc. In one embodiment, the seed tube guard comprises a cast portion and a second portion (e.g., an audible alert portion) of a different material composition than the cast portion. The different material composition also results in a different audible sound to be produced based on scraping action between the rotating metal (the opener disc rotation during operations) and the cast portion (of one material composition) and the second portion (of a different material composition than that of the cast portion). The cast portion has a side wall with a defined material thickness that, when the side wall adjacent the opener disc is worn away by the scraping action, the second portion is exposed to the opener disc, providing during scraping a distinct audible sound (e.g., distinct from the audible sound produced by the cast guard scraping against the opener disc) that alerts an operator of the wear of the cast guard and hence diminished structural integrity and diminished ability to manage disc flex.

Digressing briefly, and as indicated previously, conventional seed tube guards for row units are cumbersome to access and inspect for wear, often resulting in neglect in their service. However, since the seed tube guard provides the dual function of both protecting the adjacent seed tube and managing disc flex, wear of the seed tube guard eventually results in excessive opener disc flex and hence poor seed placement, which may negatively impact crop yield. By providing the second portion to the seed tube guard with a material composition that provides a distinct audible sound when encountering the opener disc, the operator is made aware of the lower performance of the seed tube guard, enabling an informed decision as to whether and/or when to replace the seed tube guard.

Having summarized certain features of a seed tube guard of the present disclosure, reference will now be made in detail to the description of the seed tube guard as illustrated in the drawings. While various embodiments of a seed tube guard are described in connection with these drawings, there is no intent to limit the seed tube guard to the embodiment or embodiments disclosed herein. Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Note that reference to left and right or front or rear is viewed from the perspective of a row unit being towed in a forward direction.

Figure 1B:
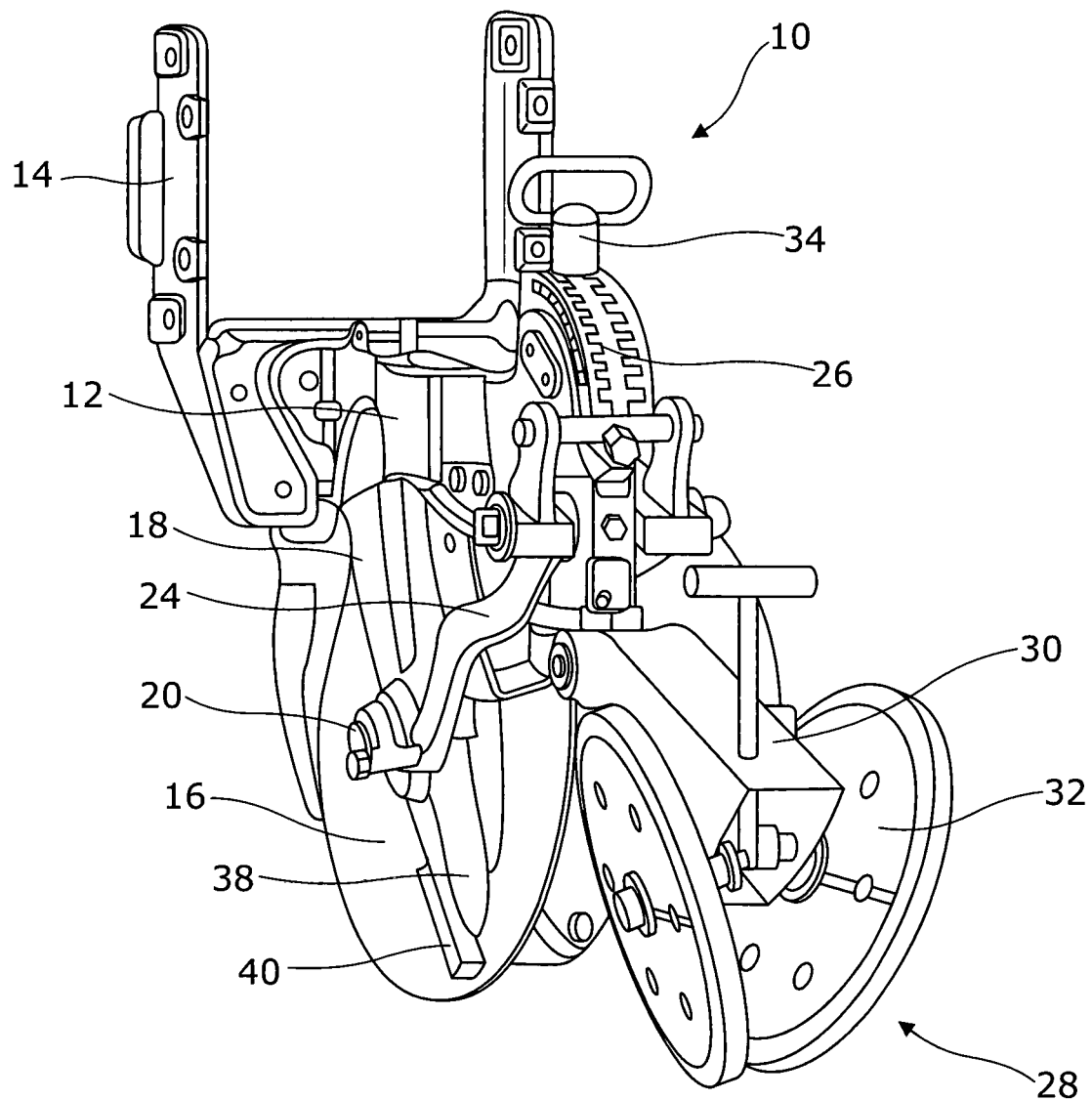
FIG. 1B is a schematic diagram that illustrates, in fragmentary left rear perspective view an embodiment of a seed tube guard.

FIGS. 1A-1B show respective fragmentary side (left) elevation and left rear perspective views of an example row unit 10 in which an embodiment of a seed tube guard is used. Note that the left gauge wheel has been removed in FIGS. 1A-1B to help better illustrate the seed tube guard placement. It should be appreciated by one having ordinary skill in the art in the context of the present disclosure that the particular row unit design depicted in FIGS. 1A-1B is used as an example environment in which an embodiment of a seed tube guard may be used, with the understanding that the seed tube guard may be used with other row units of different designs in some embodiments. Referring now to FIGS. 1A-1B, the row unit 10 comprises a fore and aft extending frame 12, a mounting bracket 14 (e.g., to which a parallel linkage is connected to a tool bar along with other row units) secured to the front side of the fore and aft extending frame 12, and one or more (e.g., a pair of) (round) opener discs 16 (one shown) operably coupled to the fore and aft extending frame 12 via a mounting bracket 18 coupled between the fore and aft extending frame 12 and a (central) hub 20 disposed at a center axis of the opener disc 16. In some embodiments, a single opener disc may be used to create a trench or furrow for seed placement. Reference hereinafter is to a single opener disc, with the understanding that a pair may be used. Also operably coupled to the fore and aft extending frame 12 are a pair of gauge wheels 22 (best shown in FIG. 1A, with the left gauge wheel omitted as explained previously) via gauge wheel arm 24. The gauge wheels 22 provide for traversal of the row unit 10 during operations in the field and also maintain proper down force control of the row unit 10. Gauge wheel arm 24 (which is also mirrored in structure and function for the right side gauge wheel) is mounted to a rearward portion of the fore and aft extending frame 12. The fore and aft extending frame 12 also comprises a gauge wheel adjustment assembly 26 to enable manual adjustment of positioning of the gauge wheels 22 (and concomitant down force adjustment for the row unit 10).

Coupled to the rear end of the fore and aft extending frame is a closing wheel assembly 28 (also referred to herein as a closing system). The closing wheel assembly 28 comprises a closing wheel assembly arm 30 rearwardly and downwardly extending from the rear of the fore and aft extending frame 12 and coupled on one end to the fore and aft extending frame 12 and operably coupled on the other end to a pair of closing wheels 32 in known fashion. The closing wheels 32 are suitably arranged to close (till) and press the closed-up trench in which the seed is placed. In some embodiments, the closing wheels 32 may be differently configured to perform the closing function, whereas a press wheel is used to provide the pressing function. The closing wheel assembly 28 further comprises a closing wheel adjustment handle 34 and closing system downforce spring 36 (disposed adjacent the closing wheel assembly arm 30) that are collectively used to enable manual adjustment of the positioning of the closing wheels (and hence adjust the down force pressure of the closing wheels).

The row unit 10 further comprises a seed tube 38 that, for double disc embodiments of the opener disc 16, extends between the pair of discs of the opener disc 16, adjacent the opener disc 16, and runs from a metering device (not shown, but which is fed by a hopper (not shown)) mounted on the fore and aft extending frame 12 to a location above yet proximal to the ground. For single opener disc embodiments, the seed tube 38 likewise runs adjacent the opener disc 16. As is known, the seed tube 38 enables the transfer of seed from the metering device to the soil. The row unit 10 further comprises a seed tube guard 40. The seed tube guard 40 is disposed forward of (e.g., by approximately ½" to ¾") a lower portion (e.g., lower ⅓rd to lower ½) of the seed tube 38 and is coupled to the hub 20 (e.g., affixed by conventional affixing means, including any one of tack weld, weld, screw, nut, bolt, rivet, etc.). The seed tube guard 40 protects the seed tube 38 from damage (e.g., due to debris, soil, etc.) and also helps manage opener disc flex and control a consistent seed trench shape. For instance, the opener disc 16 is hardened wall steel (e.g., approximately ⅛" in one embodiment, though not limited to this dimension or material) that is capable of flex (e.g., up to approximately ¾", though not limited to this amount) as it goes through the soil. The scraping action that occurs during rotation of the opener disc 16 (e.g., scraping between the opener disc 16 and a side wall of the seed tube guard 40) causes an audible sound that is based in part on the material composition of the seed tube guard. As the side of the seed tube guard 40 adjacent the rotating opener disc 16 wears away (e.g., wears away approximately ¼ inch of the seed tube guard 40, though other defined dimensions of thickness worn away may be used in some embodiments), a different portion or audible alert portion of the seed tube guard 40 is exposed, the audible alert portion having a different material composition. The audible alert portion of the seed tube guard 40 may be comprised of spring steel (whereas the worn away portion comprises cast metal or steel), which provides a distinctive sound (e.g., different than the sound provided by the scraping action with the side wall that has worn away) that alerts an operator that the seed tube guard 40 has a diminished structure and will need replacement. The thickness of the seed tube guard 40 may be configured based on the material composition of the seed tube guard 40, the opener disc 16, the speed of rotation of the opener disc 16, among other design factors that serve to determine a performance tolerance for the seed tube guard 40 and/or row unit 10.

Figure 2B:
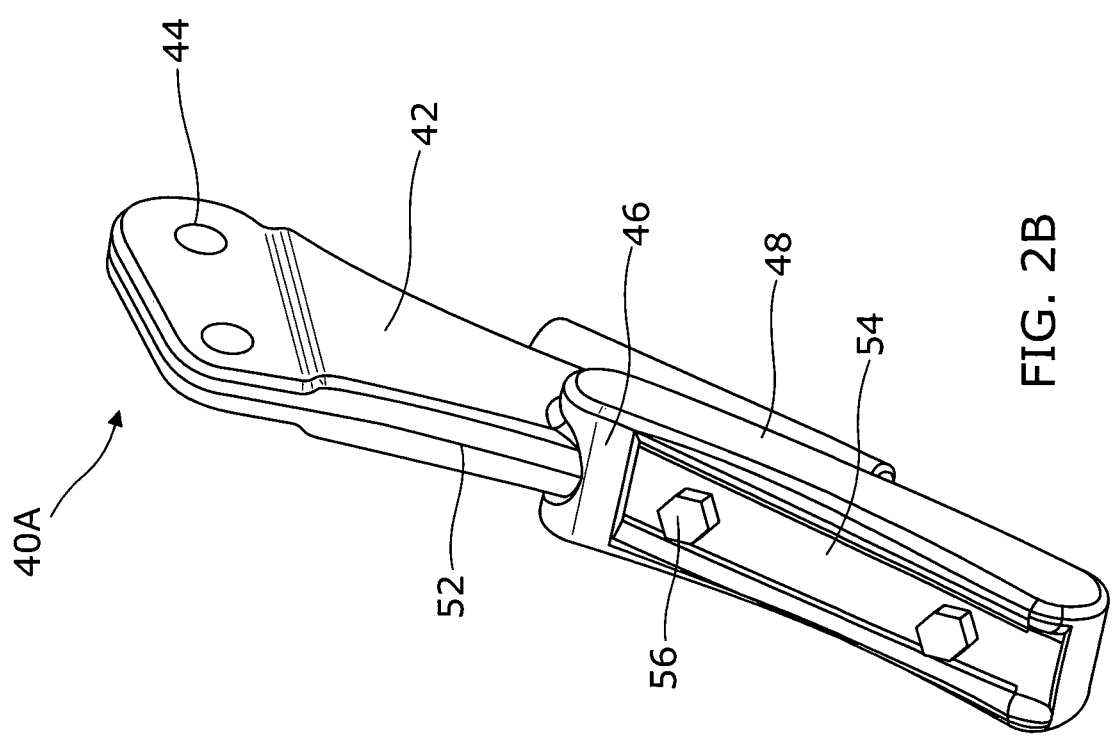
FIG. 2B is a schematic diagram that illustrates, in rear right perspective view an embodiment of a seed tube guard.
Figure 2A:
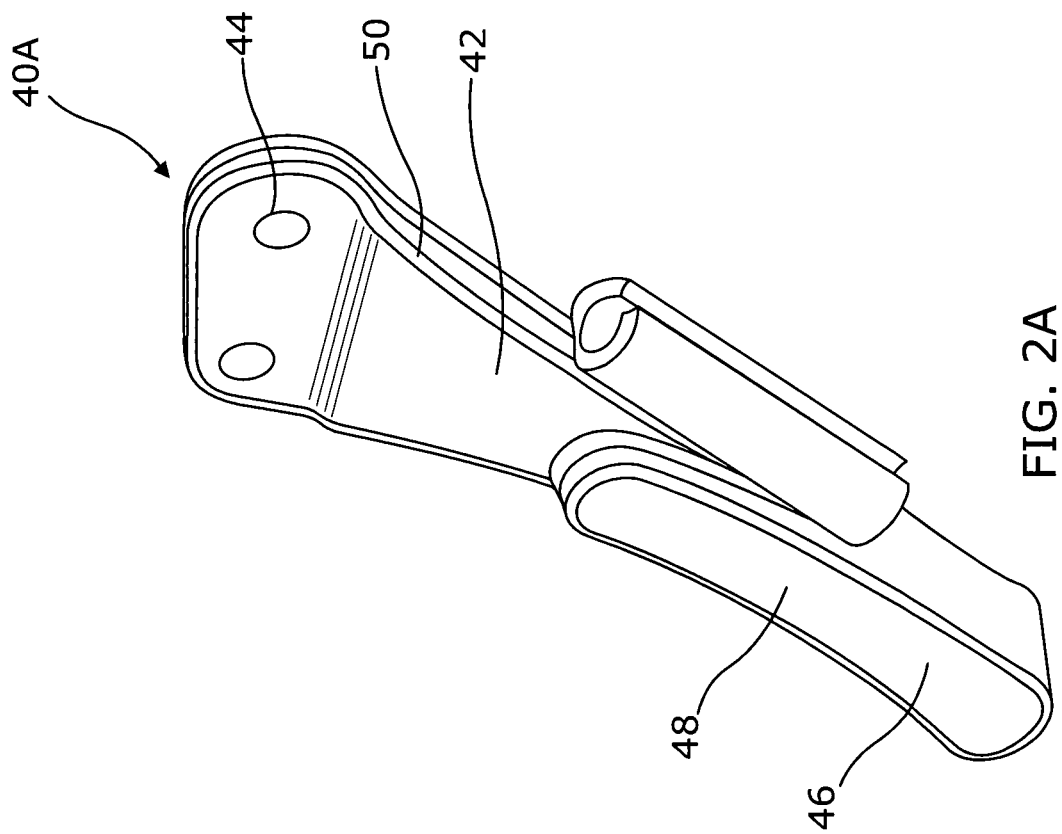
FIG. 2A is a schematic diagram that illustrates, in front right perspective view an embodiment of a seed tube guard.

Referring now to FIGS. 2A-2B, shown is an embodiment of a seed tube guard 40A that may be used as the seed tube guard 40 depicted in FIGS. 1A-1B. It should be appreciated by one having ordinary skill in the art that the seed tube guard 40A depicted in FIGS. 2A-2B is illustrative of one example design, and that variations of the structure and/or design of the seed tube guard 40A and/or the manner of placement and/or scope of area coverage of the audible alert portion of the seed tube guard 40A may be used and are contemplated to be within the scope of the disclosure. Note that dimensions referenced below are for an example embodiment, and that other dimensions may be used depending on the design of the row unit, expected working conditions, material composition, among other factors. Referring to FIG. 2A, the seed tube guard 40A comprises a thin portion 42 having a mounting portion 44 used to secure with affixing means the thin portion 42 to a compatible mounting portion of the hub 20 (FIG. 1A). In one embodiment, the face-to-face (e.g., lateral) dimension (or rather, the thickness) of the thin portion is approximately 14 millimeters (mm). The affixing means may comprise screws, bolts, rivets, etc., and in the depicted embodiment, the mounting portion 44 comprises two holes through which the affixing means may be inserted to secure the thin portion 42 to the underlying and known hub mounting structure. The seed tube guard 40A further comprises a thick portion 46. In one embodiment, the face-to-face (e.g., lateral) dimension (or rather, the thickness) of the thick portion is approximately 26 mm. The thick portion 46 has a wider lateral dimension than the thin portion 42, though in some embodiments, the lateral dimension may have more or less uniformity throughout the seed tube guard 40A. The thick portion 46 is depicted to be in the lower portion (e.g., lower half) of the seed tube guard 40A, though not limited to that range of area coverage in some embodiments. The thick portion 46 comprises an opener disc-facing side wall 48 of a defined lateral thickness. The lateral thickness of the opener disc facing side wall is chosen based on the tolerance to wear (e.g., from scraping action between the seed tube guard 40A and the opener disc 16 before reaching the audible alert portion (described below)). In one embodiment, the thickness of the opener disc facing side wall is one-quarter (¼) inch (0.25 inch, or 6.35 mm), though in some embodiments, a different thickness may be used. The seed tube guard 40A depicted in FIG. 2A is a front right perspective view, and hence the seed tube guard 40A comprises a front side 50. As indicated above, variations in the structure are contemplated, including omitting one or more elements (e.g., the cylindrical portion adjacent the front side 50) and/or changing the configuration (e.g., shape, dimensions or relative dimensions) of the structural profile or features therein. The seed tube guard 40A, including the thin portion 42, the mounting portion 44, and at least the view shown in FIG. 2A of the thick portion 46, are of a material composition comprising cast metal (e.g., cast steel). In some embodiments, the aforementioned seed tube guard portions may be of a different material composition or formed according to other techniques, such as being formed as a forged or machined component(s). For instance, for machine operations, 1045 or 4140 steel with a post-hardening operation may be used. In one embodiment, the cast material comprises ASTM A532, also subject to a post-hardening process.

Referring to FIG. 2B, shown is a rear right perspective view of the seed tube guard 40A, and includes the thin portion 42, including the mounting portion 44, and the thick portion 46, including the opener disc-facing side wall 48. From this perspective, the rear side 52 is shown, and mounted on the rear side 52 of the seed tube guard 40A is an audible alert portion 54. In the depicted embodiment, the audible alert portion 54 is located on the rear side 52, on or in the thick portion 46. In one embodiment, the audible alert portion 54 is restricted to the rear side 52, though in some embodiments, there may be portions of the audible alert portion 54 on other sides (e.g., in addition to the rear side, or in lieu of the rear side). In the depicted example, the rear side 52 of the thick portion 46 may be configured with a recess of a somewhat rectangular shape, with interior surfaces of the opener disc-facing side wall 48 and an opposing side wall on the other (lateral) end of the thick portion 46 serving as left and right borders for the audible alert portion 54. Disposed within the recess is the audible alert portion 54, which may be secured to the thick portion 46 via affixing means 56 (e.g., bolts, etc.) on the upper and lower portion of the audible alert portion 54. In other words, in one embodiment, the audible alert portion 54 is detachable (e.g., a detachable insert). Although the recess is shown as consuming most of the rear side 52 of the thick portion 46, in some embodiments, a smaller profile for the recess may be used. The depth of the recess (and hence the depth thickness of the audible alert portion 54) may be, for instance, 2 mm, though other depth dimensions may be used in some embodiments. The depth dimension of the recess may be a judicious compromise between the audible alert portion 54 and the thick portion material, depending on design considerations such as tolerable wear, etc. In one embodiment, the audible alert portion 54 comprises spring steel. For instance, in one embodiment the audible alert portion 54 comprises spring steel 5160. In some embodiments, the audible alert portion 54 may be of a different material composition.

Note that, although the audible alert portion 54 is shown as conformably fitted within a recess of the thick portion 46, and secured thereto via affixing means 56, in some embodiments, the audible alert portion 54 may be layered on top of the rear side 52 of the seed tube guard 40A (e.g., no recess) and affixed by other means (e.g., weld, adhesion, etc.), according to the same or different area profile.

In operation, scraping action between the side of the rotating opener disc 16 and the opener disc-facing side wall 48 causes wear of the side wall 48 in the lateral direction (e.g., due to disc flex). The scraping action (involving the thick portion material) causes an audible sound similar to that experienced in today's row units 10. The opener disc facing side wall 48 has a defined width (in the lateral direction), and once worn away enough to expose the side of the rotating opener disc 16 to the audible alert portion 54, results in a scraping action between the side of the rotating opener disc 16 and the audible alert portion 54. The scraping action results in a distinctly different audible sound than that created between the opener disc-facing side wall 48 and the opener disc 16, which indicates to the operator that the structural integrity of the seed tube guard 40A has diminished and is in need of replacement (e.g., soon, or depending on the chosen thickness, within a defined period of time). Note that the need for replacement may be characterized in some embodiments as more of a recommendation for replacement at least to prevent a material decline in acceptable guard performance (e.g., where seed placement is negatively impacted). The difference in audible sound results from the scraping action during opener disc flex that transitions over time from an audible sound based in part on the composition of material of the opener disc-facing side wall 48 to an audible alert based on the composition of material of the audible alert portion 54, which is different than the material composition of the opener disc-facing side wall 48.

Figure 3:
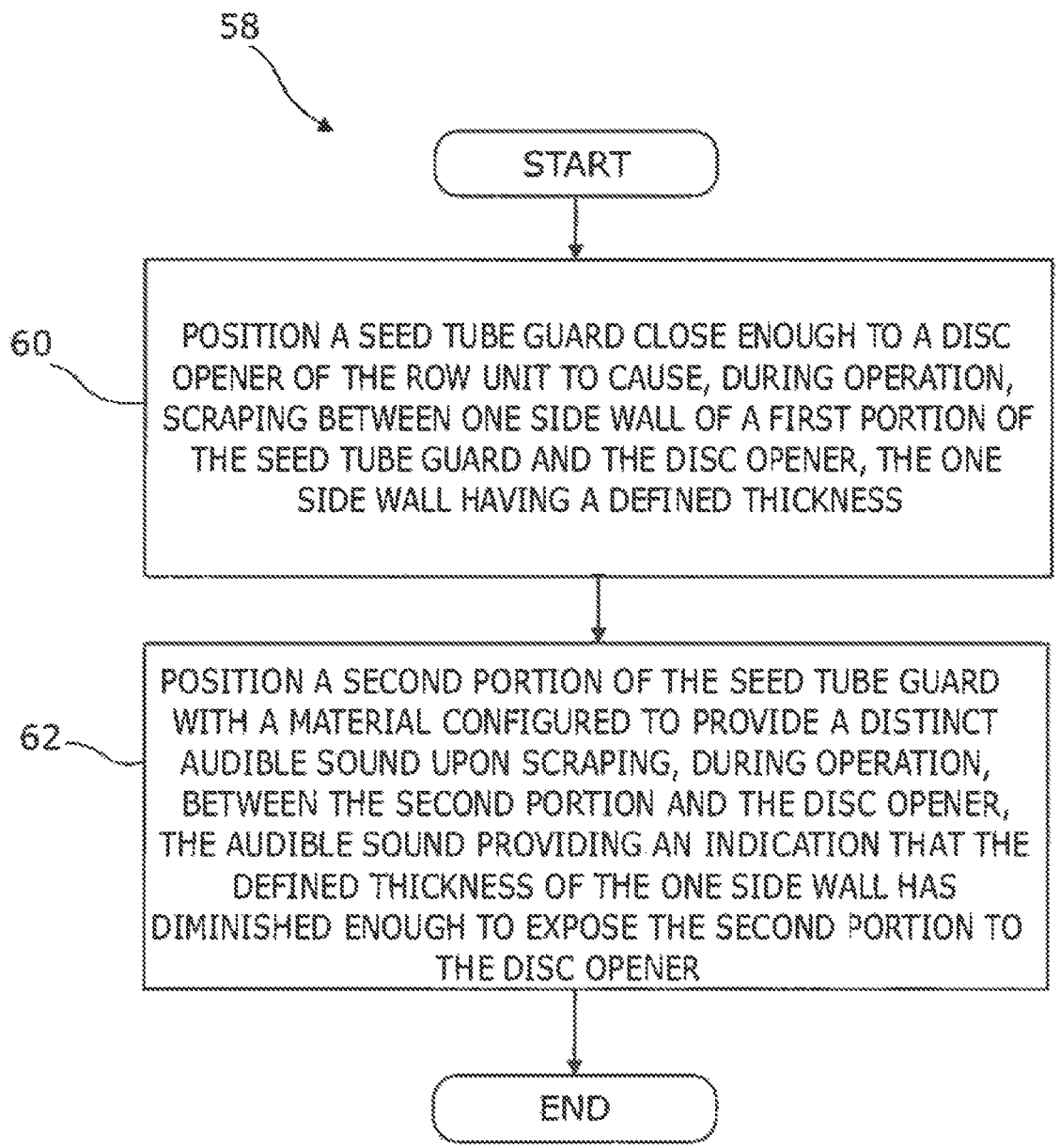
FIG. 3 is a flow diagram that illustrates an embodiment of an example method for monitoring a condition of a seed tube guard of a row unit.

In view of the above description, it should be appreciated that one embodiment of a method for monitoring a condition of a seed tube guard of a row unit, denoted as method 58 in FIG. 3, comprises positioning a seed tube guard close enough to a opener disc of the row unit to cause, during operation, scraping between one side wall of a first portion of the seed tube guard and the opener disc, the one side wall having a defined thickness (60); and positioning a second portion of the seed tube guard with a material configured to provide a distinct audible sound upon scraping, during operation, between the second portion and the opener disc, the audible sound providing an indication that the defined thickness of the one side wall has diminished enough to expose the second portion to the opener disc (62)

Any process descriptions or blocks in flow diagrams should be understood as representing steps in a process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present invention are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

The invention claimed is:

1. A row unit, comprising:
    a frame extending fore and aft;
    a pair of gauge wheels coupled to the frame;

at least one opener disc coupled to the frame and disposed between the pair of gauge wheels, the at least one opener disc comprising a round metal disc that rotates about a central hub;

a seed tube coupled to the frame and disposed adjacent the at least one opener disc; and a seed tube guard disposed adjacent the at least one opener disc and the seed tube, the seed tube guard comprising:

a body having a first portion having a first width and a second portion having a second width greater than the first width, the body comprising a first material composition, wherein the first portion is coupled to the frame; and an audible alert material having a second material composition different than the first material composition, wherein the audible alert material is carried by the second portion of the body, and wherein the at least one opener disc contacts the second portion of the body without contacting the audible alert material.

2. The row unit of claim 1, wherein the second material composition comprises spring steel.

3. The row unit of claim 1, wherein the first material composition comprises cast, forged, or machined metal.

4. The row unit of claim 1, wherein the audible alert material comprises a detachable piece affixed to the body.

5. The row unit of claim 1, wherein the body comprises a first side facing away from the seed tube and a second side facing opposite the first side and facing towards the seed tube, the second side adjacent the audible alert material.

6. The row unit of claim 1, wherein the body comprises a side wall adjacent the opener disc having a defined thickness of the first material composition, the defined thickness spanning between the side wall adjacent the opener disc and the audible alert material.

7. The row unit of claim 6, wherein the defined thickness is approximately one-quarter inch.

8. The row unit of claim 6, wherein the side wall of the defined thickness of the first material composition decreases over a period of time based on scraping between the at least one opener disc and the side wall adjacent the at least one opener disc.

9. The row unit of claim 8, wherein scraping of the side wall on at least one opener disc produces an audible noise that is distinct from an audible noise produced when the audible alert material scrapes the opener disc.

* * * * *